United States Patent [19]

Hollingsworth

[11] Patent Number: 4,765,033
[45] Date of Patent: Aug. 23, 1988

[54] QUICK-RELEASE RADIAL CLAMP

[76] Inventor: Elmont E. Hollingsworth, 12100 Wander La., Austin, Tex. 78750

[21] Appl. No.: 103,543

[22] Filed: Oct. 1, 1987

[51] Int. Cl.⁴ .............................................. B65D 63/02
[52] U.S. Cl. .................................. 24/20 CW; 24/20 R; 285/23; 411/909
[58] Field of Search ............ 24/20 CW, 20 R, 20 TT, 24/20 S, 20 EE, 23 W, 23 EE, 30.5 S, 546, 543; 285/23, 39, 252; 411/909

[56] References Cited

U.S. PATENT DOCUMENTS

| | | | |
|---|---|---|---|
| 1,379,476 | 5/1921 | Parr | 24/20 CW |
| 2,729,846 | 1/1956 | Reed | 24/20 CW |
| 2,874,430 | 2/1959 | Coldren | 24/456 |
| 3,303,669 | 2/1967 | Oetiker | 24/20 CW |
| 3,515,798 | 6/1970 | Sievert | 29/450 |
| 3,836,184 | 9/1974 | Gregory | 285/39 |
| 4,389,440 | 6/1983 | Keith | 411/909 |
| 4,425,682 | 1/1984 | Hashimoto et al. | 24/23 R |
| 4,635,966 | 1/1987 | Hermann | 285/23 |

FOREIGN PATENT DOCUMENTS 0254049 12/1948 Switzerland ............... 24/482

*Primary Examiner*—Victor N. Sakran
*Attorney, Agent, or Firm*—David L. Mossman

[57] ABSTRACT

A quick-release radial clamp for fitting over and clamping a hose onto a rigid fitting. The clamp has a split ring with an inner and outer surface. The split in the ring extends in the axial direction of the ring and forms two abutting ends. A stretched elastomeric sleeve is placed upon the outer surface of the ring and is held in that position by the ring as long as the shape of ring is held by the abutting ends. A quick-release mechanism is provided at the ends for disengaging them from their abutting positions, thereby permitting the stretched sleeve to recover and contract. This contracts the rings as well by causing the ends to slide past each other. This clamping contraction is accomplished quickly and easily and provides a sure clamp.

13 Claims, 1 Drawing Sheet

U.S. Patent   Aug. 23, 1988   4,765,033
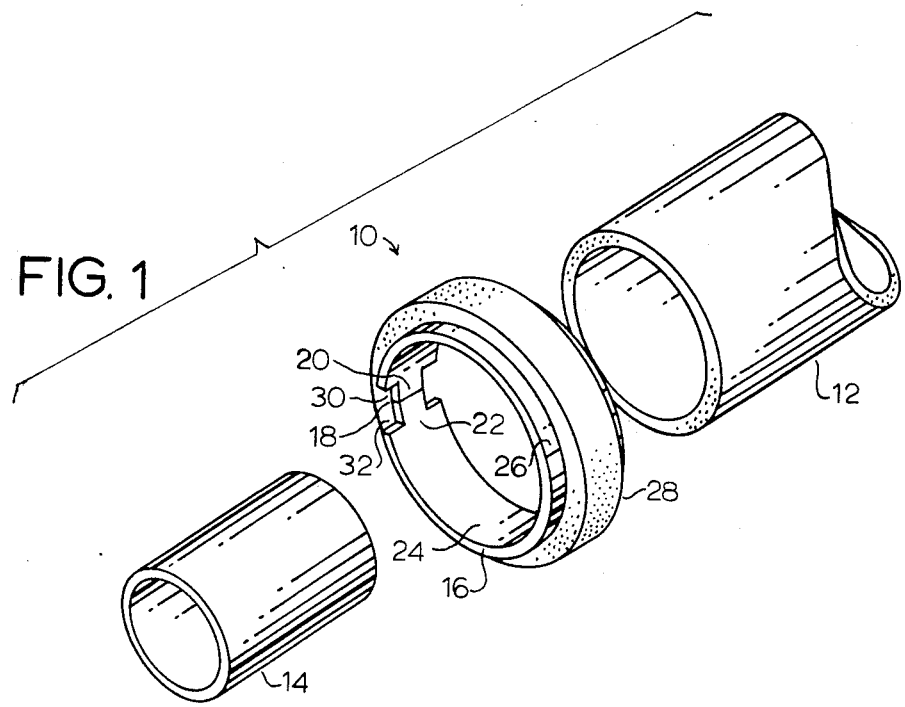
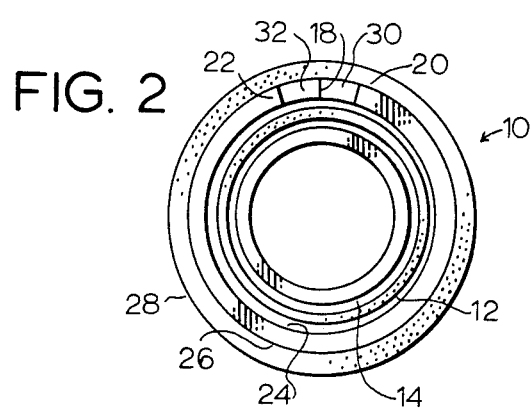
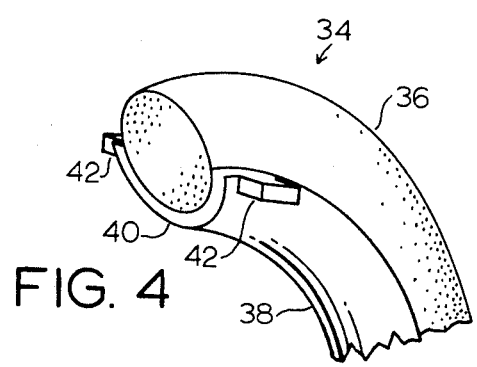
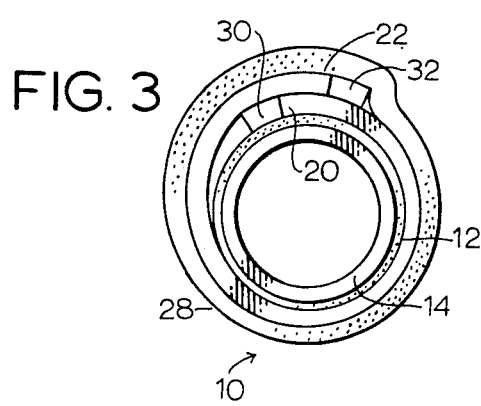
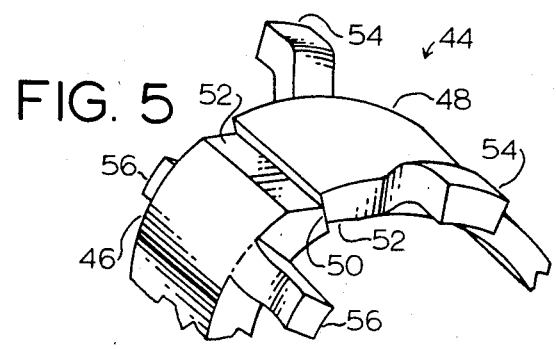

QUICK-RELEASE RADIAL CLAMP

FIELD OF THE INVENTION

The invention relates to clamping apparatus for securing onto flexible sleeves or hoses, or for clamping a sleeve or hose onto a rigid pipe or rod, and more particularly relates to radial clamps for such purposes that can be quickly and easily released to perform their clamping function.

BACKGROUND OF THE INVENTION

Devices for clamping onto hoses or sleeves, or for attaching and securing flexible sleeves, such as hoses or elastomeric couplings to pipes, tubes, rods, etc. are well known in the art. Particularly well known are the hose clamps used widely for attaching radiator hoses on autombile cooling systems which have a loop or band of metal with slots that are engaged by a screw. Other well known hose clamps include designs having various wire loop configurations that may be tightened around a hose or sleeve with a screw or other means.

However, it is also well known that the conventional hose clamps or other apparatus for clamping onto hoses or for attaching flexible sleeves to rigid objects are often difficult to attach, much less attach quickly. The primary difficulties usually involve maneuvering the clamp into place so that it may be tightened and/or getting the hose or sleeve onto the pipe or rigid tube. Often, in pursuit of a firm seal hose to pipe or rigid fitting, the pipe, hose and clamp are designed with very close tolerances, making initial placement awkward and difficult.

Other known means for placing elastic covers or clamps on cylindrical objects include the device disclosed in U.S. Pat. No. 3,515,798 to Sievert which includes an elastic tubular cover member supported in stretched condition on an easily removable one-piece rigid spiral core having interconnected adjacent coils. Disadvantages with this particular structure include the problem that the release of the cover is not particularly quick, nor can the cover be adapted to form a relatively short clamp structure.

Evans, et al. in U.S. Pat. No. 4,070,746 teach a recoverable tubular article comprising an elastomeric sleeve held in a radially expanded or extended condition, which is capable of recovering to its pre-expanded condition upon the removal of an outer restraint. Here the outer restraint is bonded to the sleeve and releases the sleeve upon the application of a solvent. A similar recoverable tubular article is taught by Krackeler, et al. in U.S. Pat. No. 4,338,970 where the outer restraint is a spiral structure that is removed and released from the collapsing sleeve by peeling the spiral support from one end.

There is additionally U.S. Pat. No. 4,300,328 which teaches a removable heat-recoverable closure assembly for a substrate which includes a heat-recoverable closure and a flexible wire to be interposed between the closure and the substrate. The wire has sufficient flexibility and sufficient strength so that in can be pulled through the wall of the closure for removal of the heat-recovered closure from the substrate. The sleeve in this patent is initially applied by one of the means described in previously mentioned U.S. Pat. Nos. 4,070,746 and 4,338,970.

Finally, there is known U.S. Pat. No. 4,389,440 to Keith which operates similarly to the device taught in U.S. Pat. No. 3,515,798 previously mentioned, that teaches an elastic cover for couplings or splices comprising a radially stretched and axially twisted elastic cover supported on a core of spirally wound polymeric material which is progressively removed from within the cover member as a continuous narrow strip.

However, each of these devices suffer from the same disadvantage mentioned earlier, that is, the clamping action is performed gradually rather than quickly. This problem slows assembly work. In addition, none of these covers may be adapted well to relatively short, ring-like structures where a long sleeve is not required or preferred, or even feasible.

SUMMARY OF THE INVENTION

Accordingly, it is an object of the present invention to provide a radial clamp for attaching to a hose or for securing a flexible or resilient sleeve or hose to a rigid member such as a pipe, tube or fitting.

Another object of the present invention is to provide a radial clamp that will attach a clamp to a flexible sleeve or hose easily and extremely quickly.

It is another object of the present invention to provide a radial clamp that can be adapted to be relatively short along its axial direction.

It is yet another object of the invention to provide a quick-release radial clamp that includes a rigid interior ring for providing a hard or rigid seal to the structure being clamped.

It is yet another object of the invention to provide a quick-release radial clamp that includes a rigid interior ring with an inwardly directed ridge that concentrates the clamping force to provide a uniform seal to the structure being clamped.

In carrying out these and other objects of the invention, there is provided, in one form, a quick-release radial clamp having a cylindrical split ring having two abutting ends. An elastomeric sleeve is coaxially positioned and stretched upon the cylindrical split ring. Additionally, a structure exists for removing the split ring ends from their abutting position thereby permitting contraction of the elastomeric sleeve. The split ring circumference within the elastomeric sleeve contracts as well.

BRIEF DESCRIPTION OF THE DRAWINGS

FIG. 1 is an isometric view of one embodiment of the quick-release radial clamp of the present invention illustrating in an exploded orientation a sleeve and pipe which may be clamped;

FIG. 2 is an end view of the embodiment of the quick-release radial clamp of FIG. 1 in its expanded state encircling a sleeve which in turn encircles a pipe onto which the sleeve is to be clamped;

FIG. 3 is an end view of the quick-release radial clamp of FIG. 2 in its contracted state;

FIG. 4 is a partial section isometric view of another embodiment of the quick-release radial clamp of the present invention wherein the elastomeric sleeve of the clamp has a circular cross-section; and FIG. 5 is a partial detail isometric view of yet another alternate embodiment of the quick-release radial clamp of this invention illustrating two optional means for causing the two abutting ends of the split ring to preferentially overlap each other upon release.

It will be appreciated that in some of the Figures the various parts are not to scale, particularly the thicknesses of the elements in FIGS. 2 and 3 are exaggerated relative to each other for the sake of clarity.

DETAILED DESCRIPTION OF THE INVENTION

The invention will now be described in more detail with reference to the various Figures. Shown in FIG. 1 is one embodiment of the quickrelease radial clamp 10 of the present invention in exploded relationship to the flexible sleeve 12 it is to surround and clamp to rigid pipe or rod 14. Flexible sleeve 12 has an outside diameter smaller than the inside diameter of the clamp 10, and pipe 14 has an outside diameter smaller than the inside diameter of sleeve 12. This relationship can be seen particularly clearly in FIG. 2 which employs similar reference numbers.

Also shown in FIG. 1 are the three primary elements of the radial clamp 10, which include interior cylindrical split ring 16 which has a cut or split 18 along the axial direction of the ring 16 which forms two abutting ends 20 and 22. Split ring 16 has an inner surface 24 and an outer surface 26. An elastomeric sleeve 28 is coaxially positioned and radially stretched upon the outer surface 26 of the split ring 16. The elastomeric sleeve 28 should be stretched enough to apply considerable inward radial force upon cylindrical split ring 16. Cylindrical split ring 16 further has the third main element of the present invention, namely a mechanism for permitting the split ring ends 20 and 22 to be removed from their abutting positions and allowing them to slide past each other under the contractive force of the elastomeric sleeve 28. This release or contraction of the split ring 16 and the elastomeric sleeve 28 occurs simultaneously and virtually instantaneously upon release of ends 20 and 22 from their abutting positions. In the particular embodiment of clamp 10 shown in FIG. 1, the mechanism for releasing ends 20 and 22 are recesses 30 and 32. These recesses permit a screw-driver or other tool to be inserted between the two ends 20 and 22 when the clamp 10 is in position around sleeve 12 in turn circling pipe 14 and, with a twist of the tool, dislodge ends 20 and 22 from their abutting positions.

The operation of the present invention may be more cleary seen with reference to FIGS. 2 and 3. As noted earlier, FIG. 2 illustrates the quickrelease radial clamp 10 in its extended or expanded configuration about sleeve 12 which is to be clamped to pipe 14. Both split ring 16 and elastomeric sleeve 28 are in their extended positions because the ends 20 and 22 are in their abutting positions.

Shown in FIG. 3 is the result of collapsing or contracting the configuration of FIG. 2 by moving split ring ends 20 and 22 out of their abutting position by means of recesses 30 and 32. This action permits ends 20 and 22 to slide past each other and permits split ring 16 to contract under the recovering force of elastomeric sleeve 28 attempting to recover to its relaxed condition. This action in turn clamps sleeve 12 onto pipe 14 in a tight-fitting and sealing relationship. If elastomeric sleeve 28 is made sufficiently strong, the clamping action will be quite strong. As noted earlier, the clamping action occurs almost instantaneously upon the release of split ring ends 20 and 22 from their abutting positions, hence the present invention is eminently suited to perform as a quick-release radial clamp.

The cross-section of the elastomeric sleeve 28 and split ring 16 of the quick-release radial clamp 10 need not be flat. For example, shown in FIG. 4 is an alternate embodiment of the quick-release radial clamp 34 in which elastomeric sleeve 36 has a circular cross-section. Similarly, the split ring 38 for this embodiment may have a cross-section which is arc-shaped or semi-circular in shape to be adapted to mate with the circular cross-section of sleeve 36. An alternate embodiment for the quick-release mechanism to permit the end 40 to side past its mating, abutting end (not shown) are tabs 42 which extend laterally from the split ring end 40 in the axial direction of clamp 34.

As with recesses 30 and 32, tab 42 would permit a screw-driver or other common tool to release the split ring 38 ends from their abutting positions and perform the clamping action.

Shown in FIG. 5 is a detail of further options for the quick-release radial clamp of the present invention. In some applications, it may be desirable to ensure which of the two ends of the split ring slides over the other, and which would slide under the over-riding end. FIG. 5 illustrates two ways by which this may occur. Cylindrical split ring 44 has two opposite abutting ends 46 and 48 across a cut or split 50. In one option, ends 46 and 48 each have a bevel 52 in the axial direction, but on opposite sides of the ring 44. That is, the bevel 52 on end 46 is outside the ring 44, whereas the bevel 52 on end 48 is on underneath or inside of ring 44. Thus, it is easier for the operator of the clamp to permit end 48 to over-ride end 46. Another means by which ends 46 and 48 may be designed to preferentially slide one over the other would be to provide laterally extending tabs, such as the tabs 42 of FIG. 4, but to offset the tabs. For example, tabs 54 out outwardly offset, while tabs 56 are inwardly offset. An operator wishing to trip the clamp by disengaging ends 46 and 48 would be inclined to insert a screw-driver blade between the tabs and twist the blade in a counter-clockwise direction to permit end 48 to more easily over-ride end 46 than would be the reverse situation.

An embodiment where it would be desired to have preferentially over-riding split ring ends might be one in which different contact surface textures on the interior, underlapping surface of the split ring from the overlapping end surfaces of the ring might be desired. Or, in another embodiment, the inner surface of the over-riding end and the outer surface of the under-riding end may be provided with an interlocking mechanism to permit a more secure clamp under the influence of the collapsing or recovering elastomeric sleeve.

It will be understood that the invention is not limited to the particular embodiments shown and described herein. For example, the stretched elastomeric sleeve and the split ring may have different cross-sectional shapes than those illustrated. In addition, the mechanism for releasing the split ring ends from their abutting positions, which maintains the ring in its expanded configuration and restrains the elastomeric sleeve from collapsing until the clamping action is needed, may be different from those illustrated.

Additionally, the materials of which the quick-release radial clamp is made may vary within the scope of the invention. The cylindrical split ring may be zinc-plated cold rolled steel or stainless steel or other suitable rigid metal, or even a strong rigid, but somewhat flexible plastic such as polypropylene or other engineering plastic. Further, the elastomeric sleeve that acts to contract the clamp may be made out of many elastomeric or elastic materials as long as the required force is applied to the split ring. For example, natural or synthetic rubbers or materials such as ethylene propylene diene monomer (EPDM) may be found to be suitable for this application. It should be kept in mind that an important advantage of the radial clamp of this invention is to provide a clamp with a uniform clamping force around the clamping perimeter.

Other design features may be modified within the scope of the invention. For example, the spltis 18 and 50 in FIGS. 1 and 5, respectively, are shown to be straight and parallel to the axis of the clamp. However, these splits where the abutting ends of the spit ring meet could be of other configurations, such as tongue-and-groove, V-shaped or wave-shaped, for example, and still fulfill the requirements of the present invention.

I claim:

1. A radial clamp comprising:
   a cylindrical split ring having two abutting ends;
   an elastomeric sleeve coaxially positioned and stretched upon the cylindrical split ring; and
   means for removing the split ring ends from their abutting positions in a radial direction thereby permitting them to slide one beneath the other, the ring thereby contracting under the contraction of the elastomeric sleeve.

2. The radial clamp of claim 1 wherein the elastomeric sleeve has a circular cross-section.

3. The radial clamp of claim 1 wherein the means for removing the split-ring ends from their abutting positions comprises tabs extending laterally from said ends.

4. The radial clamp of claim 1 wherein the means for removing the split ring ends from their abutting positions comprises a recess in at least one of said ends.

5. The radial clamp of claim 1 wherein the means for removing the split ring ends from the abutting positions preferentially permits a selected end to slide under a remaining end.

6. The radial clamp of claim 5 wherein the split ring ends have an interior and an exterior surface, and the selected end has a lateral bevel on its exterior surface while the remaining end has a lateral bevel on its interior surface.

7. The radial clamp of claim 5 wherein the split ring ends have an interior and an exterior surface and the selected end has tabs extending laterally therefrom disposed toward the interior surface and the remaining end has tabs extending laterally therefrom disposed toward the exterior surface.

8. A radial clamp comprising:
   a cylindrical split ring having two opposing ends in abutting positions, and an inner surface and an outer surface;
   an elastomeric sleeve coaxially positioned and radially stretched upon the outer surface of the cylindrical split ring; and
   means for permitting the two opposing ends of the split ring to be released from their abutting positions in a radial direction and allowing them to slide one beneath the other, the ring thereby contracting under the contractive force of the elastomeric sleeve.

9. The radial clamp of claim 8 wherein the elastomeric sleeve has a circular cross-section.

10. The radial clamp of claim 8 wherein the means for removing the split ring ends from their abutting positions comprises tabs extending laterally from said ends.

11. The radial clamp of claim 8 wherein the means for removing the split ring ends from their abutting positions comprises a recess in at least one of said ends.

12. The radial clamp of claim 8 wherein the means for removing the split ring ends from the abutting positions preferentially permits a selected end to slide under a remaining end thereof.

13. A radial clamp comprising:
   a cylindrical split ring having two opposing ends, wherein one end is a selected end and the other end is a remaining end, and wherein the two ends are in abutting positions, and the split ring additionally has an inner surface and an outer surface;
   an elastomeric sleeve coaxially positioned and radially stretched upon the outer surface of the cylindrical split ring; and
   means for permitting the two opposing ends of the split ring to be released from their abutting position in a radial direction thereby allowing them to slide past each other preferentially permitting the selected end to slide under the remaining end, allowing the cylindrical split ring to contract under the contractive force of the elastomeric sleeve.

* * * * *